(12) United States Patent
Tsutaoka

(10) Patent No.: US 11,210,771 B2
(45) Date of Patent: Dec. 28, 2021

(54) IMAGE EVALUATION APPARATUS, IMAGE EVALUATION METHOD, AND IMAGE EVALUATION PROGRAM USING IMPRESSION VALUES OF REPRESENTATIVE IMAGES

(71) Applicant: FUJIFILM Corporation, Tokyo (JP)

(72) Inventor: Takuya Tsutaoka, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 237 days.

(21) Appl. No.: 16/547,442

(22) Filed: Aug. 21, 2019

(65) Prior Publication Data

US 2019/0378262 A1  Dec. 12, 2019

Related U.S. Application Data

(63) Continuation of application No. PCT/JP2018/004991, filed on Feb. 14, 2018.

(30) Foreign Application Priority Data

Mar. 15, 2017 (JP) .............................. JP2017-049943

(51) Int. Cl.
| | | |
|---|---|---|
| *G06K 9/00* | (2006.01) | |
| *G06T 7/00* | (2017.01) | |
| *G06K 9/62* | (2006.01) | |

(52) U.S. Cl.
CPC .......... *G06T 7/0002* (2013.01); *G06K 9/6218* (2013.01); *G06K 9/6272* (2013.01); *G06T 2207/20224* (2013.01)

(58) Field of Classification Search
CPC ......... G06T 7/0002; G06T 2207/20224; G06T 1/00; G06K 9/6218; G06K 9/6272; G06K 9/036; G06F 16/00
See application file for complete search history.

(56) References Cited

U.S. PATENT DOCUMENTS

| 2011/0081088 A1* | 4/2011 | Xiao .................. G06K 9/00664 |
|---|---|---|
| | | 382/218 |
| 2011/0129159 A1* | 6/2011 | Cifarelli .................. G06F 16/51 |
| | | 382/224 |

(Continued)

FOREIGN PATENT DOCUMENTS

| JP | 2000-276484 A | 10/2000 |
|---|---|---|
| JP | 2003-076717 A | 3/2003 |

(Continued)

OTHER PUBLICATIONS

International Search Report issued in PCT/JP2018/004991; dated Mar. 20, 2018.

(Continued)

*Primary Examiner* — Andrew M Moyer
(74) *Attorney, Agent, or Firm* — Studebaker & Brackett PC

(57) ABSTRACT

There are provided an image evaluation apparatus, an image evaluation method, and an image evaluation program capable of highly evaluating an image having an impression of a user's preference. A plurality of images included in a first image group are input to an image evaluation apparatus (step 21). A plurality of representative image candidates are displayed (step 22), and the user selects a desired representative image from the representative image candidates (step 23). The difference between the impression value of the representative image and the impression value of the input image is calculated (step 24), and the image quality of the input image is determined (step 25). An image evaluation value is calculated so as to become higher as the difference between the impression values becomes smaller and the image quality becomes higher (step 26).

11 Claims, 13 Drawing Sheets

(56) References Cited

U.S. PATENT DOCUMENTS

| | | | | |
|---|---|---|---|---|
| 2015/0086120 A1* | 3/2015 | Yamaji | .................... | G06T 11/60 |
| | | | | 382/195 |
| 2015/0161147 A1* | 6/2015 | Zhao | ....................... | G06F 17/10 |
| | | | | 707/772 |
| 2016/0019416 A1 | 1/2016 | Noguchi | | |
| 2016/0063746 A1* | 3/2016 | Furuya | .................. | G06T 3/4053 |
| | | | | 382/209 |
| 2019/0146991 A1* | 5/2019 | Sato | ................... | G06K 9/00369 |
| | | | | 382/224 |

FOREIGN PATENT DOCUMENTS

| | | | |
|---|---|---|---|
| JP | 2004-005303 | A | 1/2004 |
| JP | 2004-259061 | A | 9/2004 |
| JP | 2006-099267 | A | 4/2006 |
| JP | 2012-164000 | A | 8/2012 |
| JP | 2015-118522 | A | 6/2015 |
| JP | 2016-194857 | A | 11/2016 |
| WO | 2014156559 | A1 | 10/2014 |

OTHER PUBLICATIONS

International Preliminary Report on Patentability and Written Opinion issued in PCT/JP2018/004991; dated Sep. 17, 2019.

\* cited by examiner

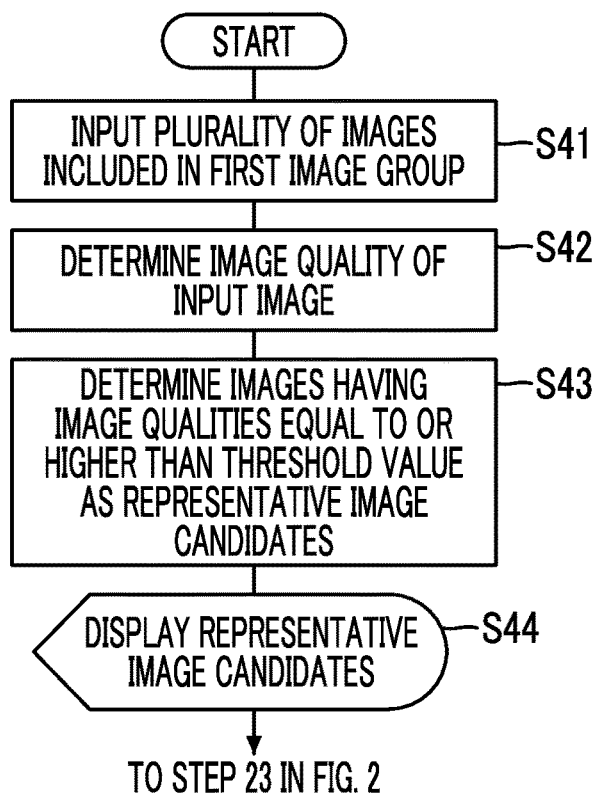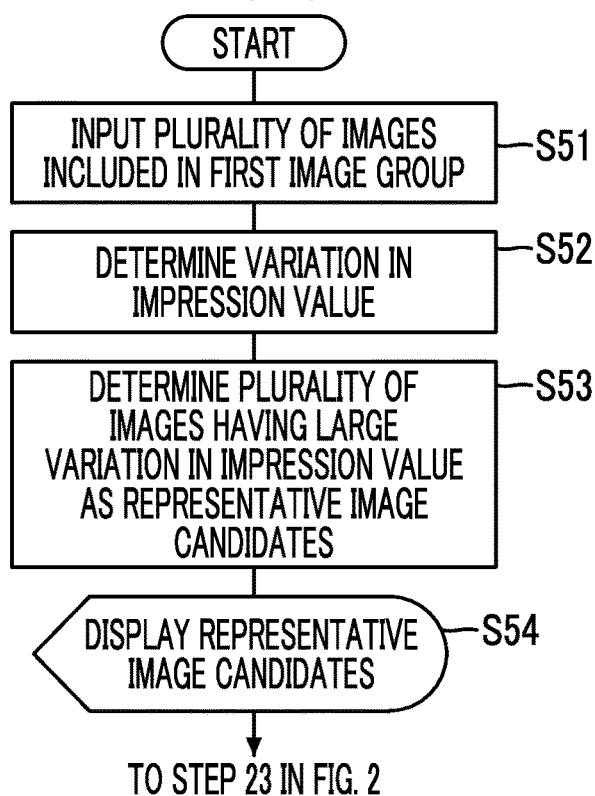

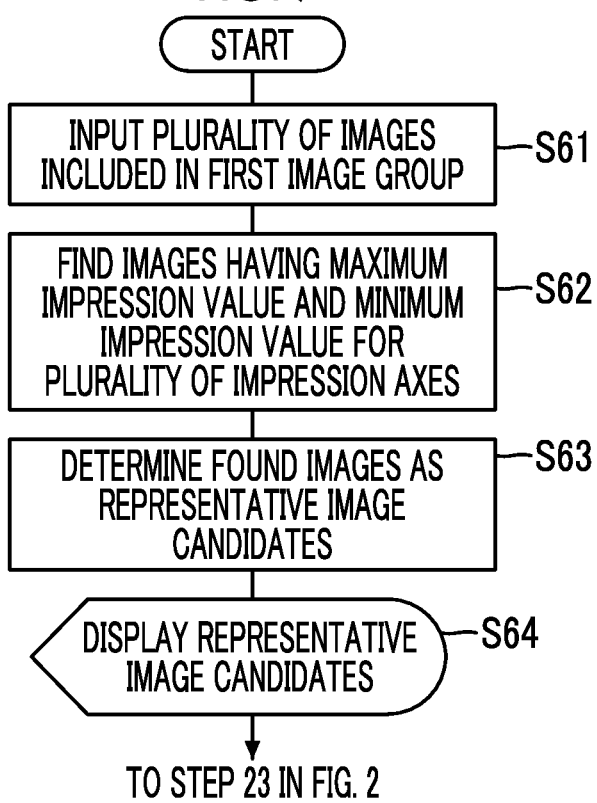

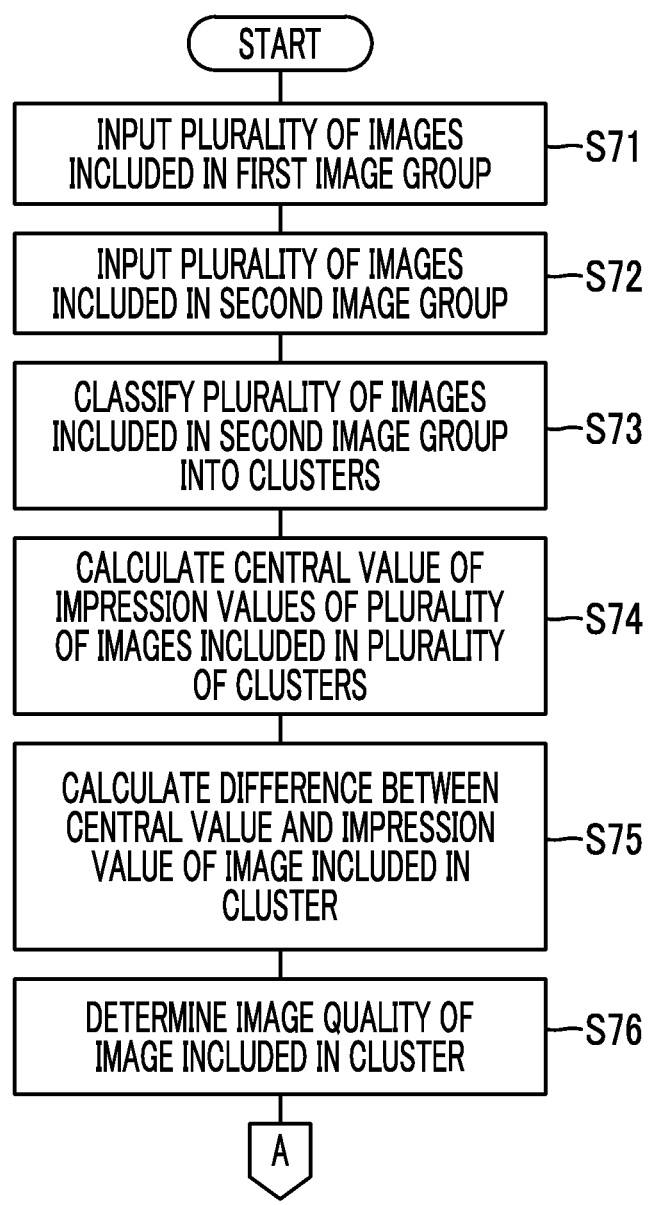

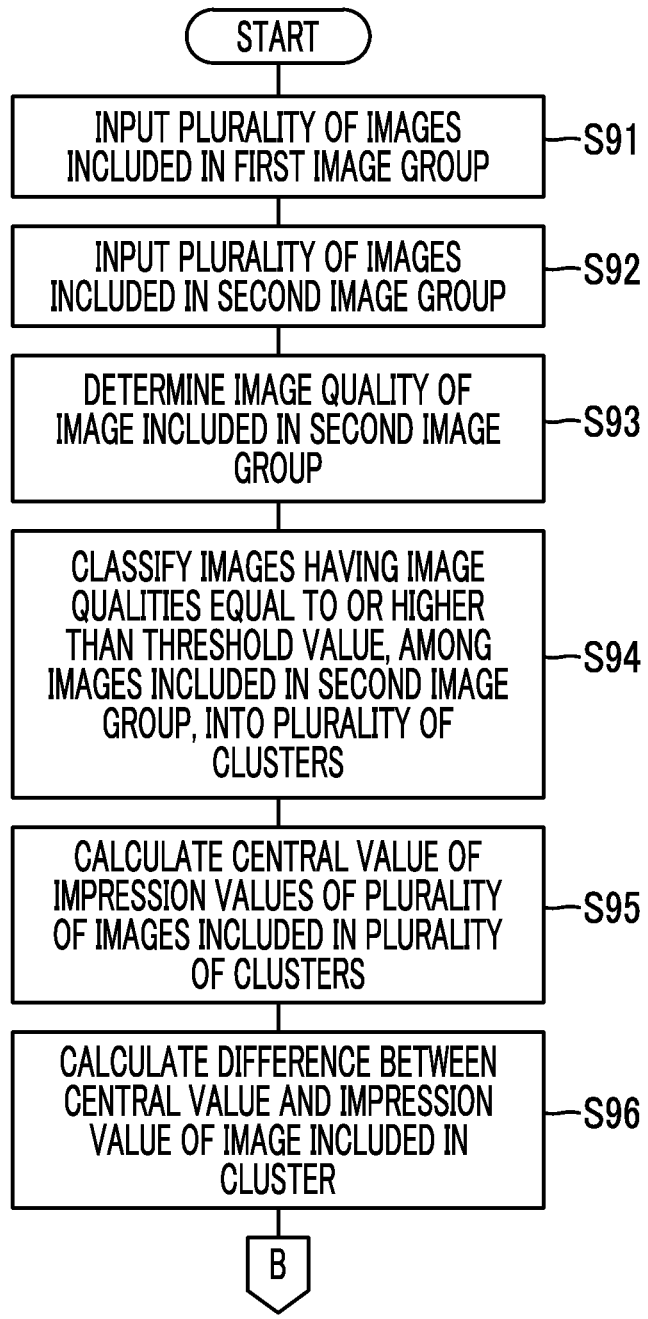

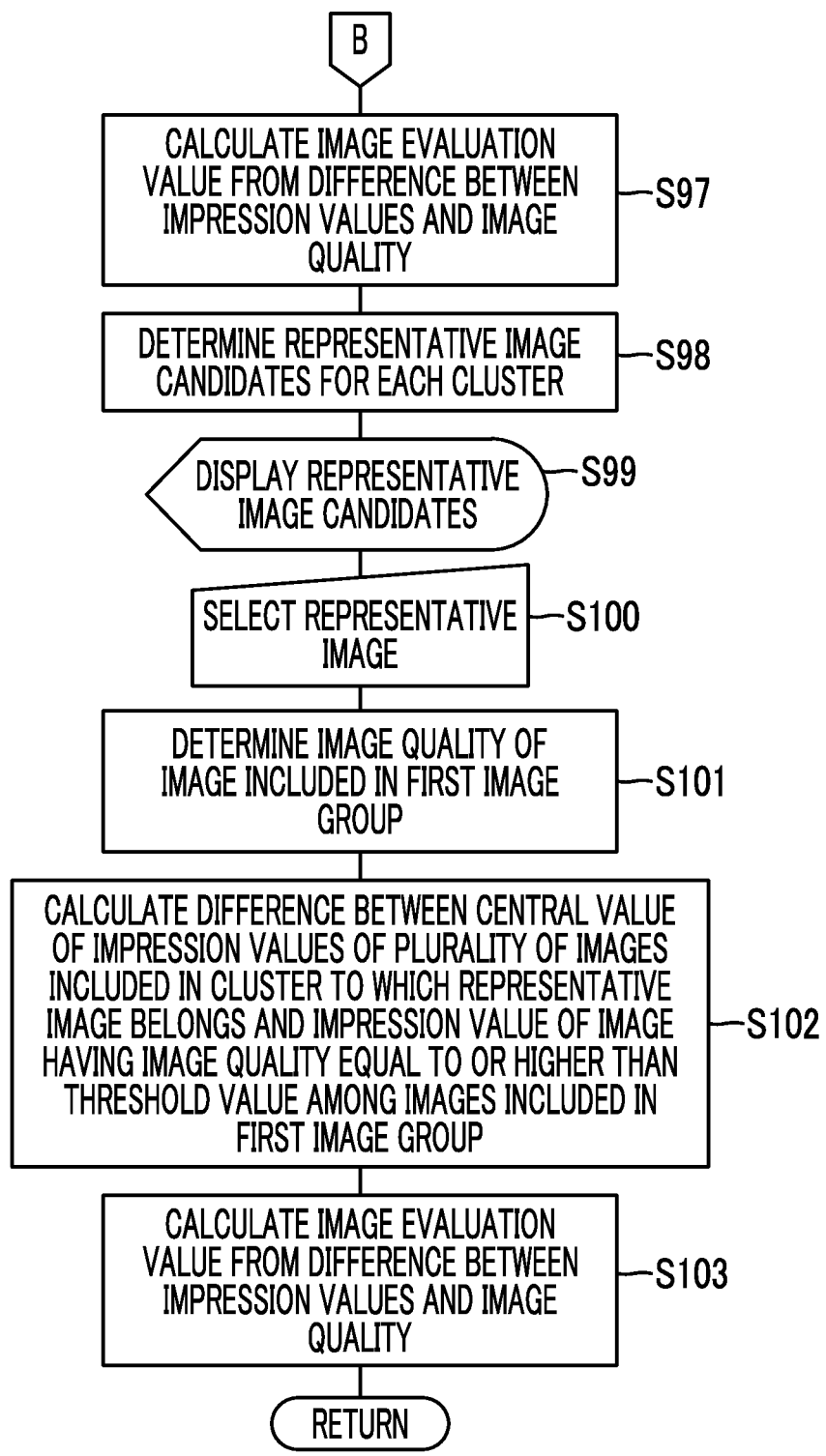

IMAGE EVALUATION APPARATUS, IMAGE EVALUATION METHOD, AND IMAGE EVALUATION PROGRAM USING IMPRESSION VALUES OF REPRESENTATIVE IMAGES

CROSS-REFERENCE TO RELATED APPLICATIONS

This application is a Continuation of PCT International Application No. PCT/JP2018/004991 filed on Feb. 14, 2018, which claims priority under 35 U.S.C. § 119(a) to Japanese Patent Application No. 2017-049943 filed on Mar. 15, 2017. Each of the above application(s) is hereby expressly incorporated by reference, in its entirety, into the present application.

BACKGROUND OF THE INVENTION

1. Field of the Invention

The present invention relates to an image evaluation apparatus, an image evaluation method, and an image evaluation program.

2. Description of the Related Art

Pasting an image on a base image, such as a template, by a user to generate the user's desired composite image, such as in a post card, an electronic album, and a photobook, has been performed. Although the user may select an image to be pasted on the base image, it is troublesome to designate an image to be pasted from a number of images. For this reason, there is a case where an image to be pasted on the base image is automatically found from a number of images. As an example of finding an image from a number of images, an image is found based on a visual impression element indicating a part as a feature of each image (JP2016-194857A). In addition, a template with an atmosphere suitable for the content of an object, such as an image, is selected (JP2012-164000A). In addition, target image data can be searched for from a plurality of pieces of image data based on an impression on the target image data (JP2006-099267A), a similar image that matches the human sense of similarity is obtained (JP2004-005303A), and a subject image to be pasted on the album is determined with reference to feature amounts, such as the face position, the brightness of the subject image, and the shake amount of the subject image (JP2015-118522A).

SUMMARY OF THE INVENTION

In the case of the method described in JP2016-194857A, however, since the visual impression part is only for a part of the image, it may not be possible to evaluate an image that is different from the impression obtained from the entire image. The method described in JP2012-164000A merely selects a template. In the case of the method described in JP2006-099267A, since the target image data is searched for using visual features, images that cannot be expressed from the visual features cannot be evaluated. Also in the case of the method described in JP2004-005303A, since visual features are used, images that cannot be expressed from the visual features cannot be evaluated. In the case of the method described in JP2015-118522A, since a subject image is only determined by the face position or the like, an image having a desired impression cannot be highly evaluated.

An object of the present invention is to make it possible to highly evaluate an image having a user's favorite impression. In addition, another object of the present invention is to make it possible to secure not only the user's preference but also the objectivity of image evaluation.

An image evaluation apparatus according to the present invention comprises: a first image input device (a first image input device) to which a plurality of images included in a first image group are input: a representative image selection device (a representative image selection device) for selecting a representative image; and a first image evaluation value calculation device (a first image evaluation value calculation device) for calculating an image evaluation value from a difference between an impression value of the representative image selected by the representative image selection device and an impression value of each of the plurality of images input to the first image input device and an image quality of each of the plurality of images included in the first image group.

The present invention also provides an image evaluation method suitable for an image evaluation apparatus. That is, the method comprises: causing a plurality of images included in a first image group to be input to a first image input device; causing a representative image selection device to select a representative image; and causing a first image evaluation value calculation device to calculate an image evaluation value from a difference between an impression value of the representative image selected by the representative image selection device and an impression value of each of the plurality of images input to the first image input device and an image quality of each of the plurality of images included in the first image group.

An image evaluation apparatus that inputs a plurality of images included in a first image group, selects a representative image, and calculates an image evaluation value from a difference between an impression value of the selected representative image and an impression value of each of the plurality of images input to a first image input device and an image quality of each of the plurality of images included in the first image group may be provided by a processor.

In addition, the present invention also provides a non-transitory recording medium that stores program for controlling a computer of an image evaluation apparatus. The present invention further provides an image evaluation apparatus, comprising: a first image input device to which a plurality of images included in a first image group are input; a representative image selection device for selecting a representative image; and a processor; wherein the processor calculate an image evaluation value from a difference between an impression value of the representative image selected by the representative image selection device and an impression value of each of the plurality of images input to the first image input device and an image quality of each of the plurality of images included in the first image group.

The image evaluation apparatus may further comprise a representative image candidate display control device (a representative image candidate display control device) for displaying images having image qualities equal to or higher than a threshold value, among the plurality of images input to the first image input device, as representative image candidates. In this case, for example, the representative image selection device selects at least one representative image candidate, among the representative image candidates displayed under control of the representative image candidate display control device, as a representative image.

The image evaluation apparatus may further comprise a representative image candidate display control device (a representative image candidate display control device) for displaying a plurality of images having a large variation in impression value, among the plurality of images input to the first image input device, as representative image candidates. In this case, for example, the representative image selection device selects at least one representative image candidate, among the representative image candidates displayed under control of the representative image candidate display control device, as a representative image.

The image evaluation apparatus may further comprise a representative image candidate display control device (a representative image candidate display control device) for displaying a plurality of images having a maximum value or a minimum value of each impression value for impression values of a plurality of impression axes, among the plurality of images input to the first image input device, as representative image candidates. In this case, for example, the representative image selection device selects at least one representative image candidate, among the representative image candidates displayed under control of the representative image candidate display control device, as a representative image.

The image evaluation apparatus may further comprise: a second image input device (a second image input device) to which a plurality of images included in a second image group are input; an image classification device (an image classification device) for classifying the plurality of images included in the second image group into a plurality of clusters based on an impression value of each of the plurality of images included in the second image group; a second image evaluation value calculation device (a second image evaluation value calculation device) for calculating an image evaluation value of each of the plurality of images included in the clusters based on a difference between a central value of impression values of the plurality of images included in the plurality of clusters classified by the image classification device and an impression value of each image included in the clusters and an image quality of each image included in the clusters; a representative image candidate determination device (a representative image candidate determination device) for determining representative image candidates for each of the clusters based on the image evaluation value calculated by the second image evaluation value calculation device; and a representative image candidate display control device (a representative image candidate display control device) for displaying the representative image candidates determined by the representative image candidate determination device. In this case, it is preferable that the representative image selection device selects at least one representative image candidate, among the representative image candidates displayed under control of the representative image candidate display control device, as a representative image and that the first image evaluation value calculation device calculates the image evaluation value based on a difference between a central value of impression values of a plurality of images included in a cluster to which the representative image selected by the representative image selection device belongs, among the plurality of clusters, and an impression value of each of the plurality of images included in the first image group input to the first image input device and an image quality of each of the plurality of images included in the first image group.

The plurality of images included in the first image group and the plurality of images included in the second image group are stored in the same storage device, for example.

In addition, the plurality of images included in the first image group and the plurality of images included in the second image group may be the same.

For example, the first image evaluation value calculation device calculates the image evaluation value, in a case where a difference between a central value of impression values of a plurality of images included in a cluster to which the representative image belongs and an impression value of each of the plurality of images included in the first image group is large, to be lower than in a case where the difference is small and calculates the image evaluation value, in a case where an image quality of each of the plurality of images included in the first image group is poor, to be lower than in a case where the image quality is good. For example, the second image evaluation value calculation device calculates the image evaluation value, in a case where a difference between a central value of impression values of the plurality of images included in the cluster and an impression value of each image included in the cluster is large, to be lower than in a case where the difference is small and calculates the image evaluation value, in a case where an image quality of each image included in the cluster is poor, to be lower than in a case where the image quality is good.

For example, the image classification device classifies the plurality of images into a plurality of clusters based on an impression value of each image for a plurality of images having image qualities equal to or higher than a threshold value among the plurality of images included in the second image group. For example, the second image evaluation value calculation device calculates the image evaluation value based on a difference between a central value of impression values of a plurality of images included in a cluster to which the representative image selected by the representative image selection device belongs, among the plurality of clusters, and an impression value of an image having an image quality equal to or higher than the threshold value, among the plurality of images included in the second image group, and an image quality of each of the plurality of images included in the second image group.

The image evaluation apparatus may further comprise a word display control device (a word display control device) for displaying a word, which indicates an impression of the representative image candidate displayed under control of the representative image display control device, together with the representative image candidate.

According to the present invention, a plurality of images included in the first image group are input to the image evaluation apparatus. In addition, a representative image is selected. The image evaluation value is calculated from the difference between the impression value of the selected representative image and the impression value of each of the plurality of input images and the image quality of each of the plurality of input images.

Since the user selects his or her favorite representative image, an image having an impression value close to the impression value of the selected representative image can be highly evaluated. Therefore, it is possible to evaluate an image having a user's favorite impression. In addition, since not only the impression value but also the image quality is considered, not only the user's favorite image but also a high-quality image is highly evaluated. Accordingly, the objectivity of image evaluation can be secured.

BRIEF DESCRIPTION OF THE DRAWINGS

FIG. 5 is a flowchart showing a part of the processing procedure of the image evaluation apparatus.

FIG. 6 is a flowchart showing a part of the processing procedure of the image evaluation apparatus.

FIG. 7 is a flowchart showing a part of the processing procedure of the image evaluation apparatus.

FIG. 8 is a flowchart showing the processing procedure of the image evaluation apparatus.

FIG. 15 is a flowchart showing the processing procedure of the image evaluation apparatus.

FIG. 16 is a flowchart showing the processing procedure of the image evaluation apparatus.

DESCRIPTION OF THE PREFERRED EMBODIMENTS

First Embodiment

Figure 1:
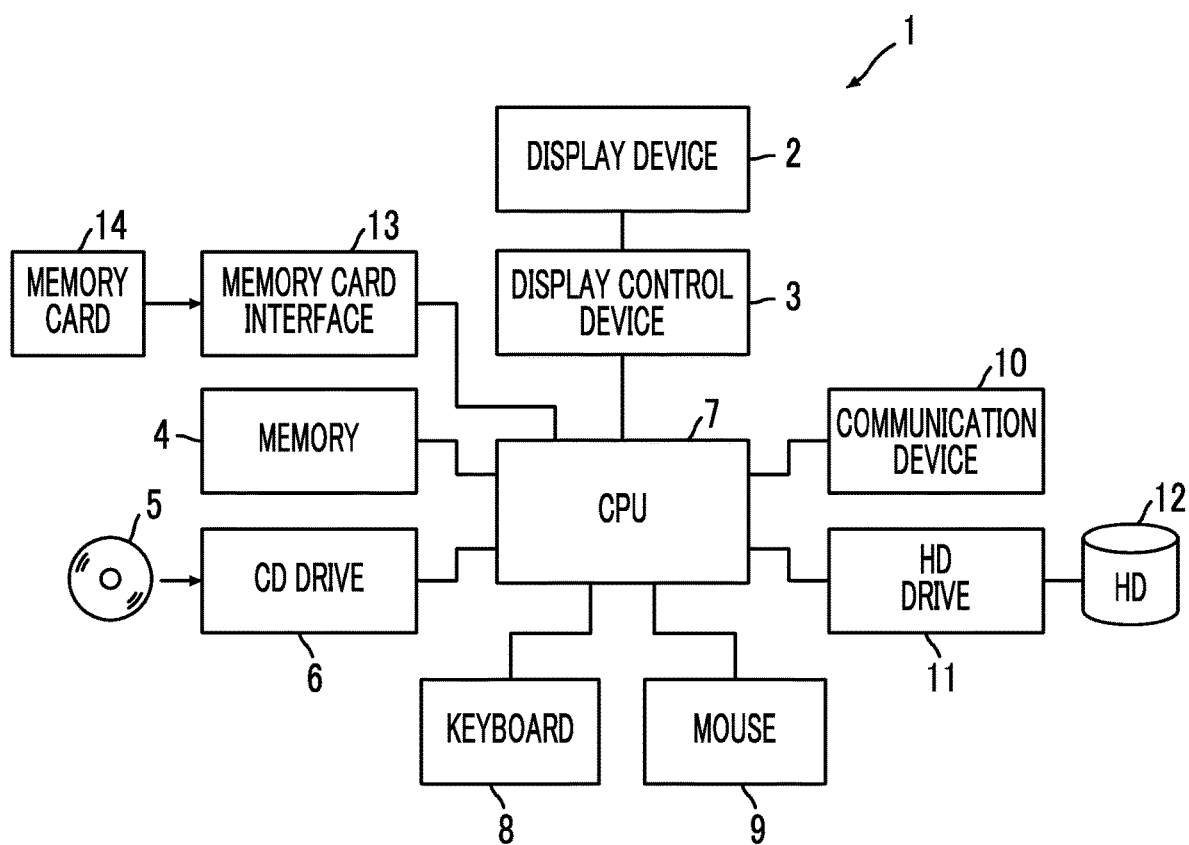
FIG. 1 is a block diagram showing the electric configuration of an image evaluation apparatus.

FIG. 1 shows an embodiment of the present invention, and is a block diagram showing an electrical configuration of an image evaluation apparatus 1.

The entire operation of the image evaluation apparatus 1 is controlled by a central processing unit (CPU) 7.

The image evaluation apparatus 1 includes a display device 2 controlled by a display control device 3, a memory 4 for temporarily storing data, a compact disc (CD) drive 6 for accessing a compact disc 5, and a keyboard 8 and a mouse 9 for giving an instruction to the image evaluation apparatus 1. The image evaluation apparatus 1 also includes a hard disk (HD) drive 11 for accessing a hard disk (HD) 12 and a communication device 10 for communicating with a server (not shown) or the like. Further, the image evaluation apparatus 1 also includes a memory card interface 13 for reading an image file and the like stored in a memory card 14.

The compact disc 5, which controls operations to be described later and in which a computer readable program is stored, is loaded into the image evaluation apparatus 1, and the program stored in the compact disc 5 is read by the CD drive 6. By installing the read program on the image evaluation apparatus 1, the image evaluation apparatus 1 performs an operation to be described later. The program for controlling the image evaluation apparatus 1 may be received through the Internet instead of being read from a recording medium, such as the compact disc 5.

Figure 2:
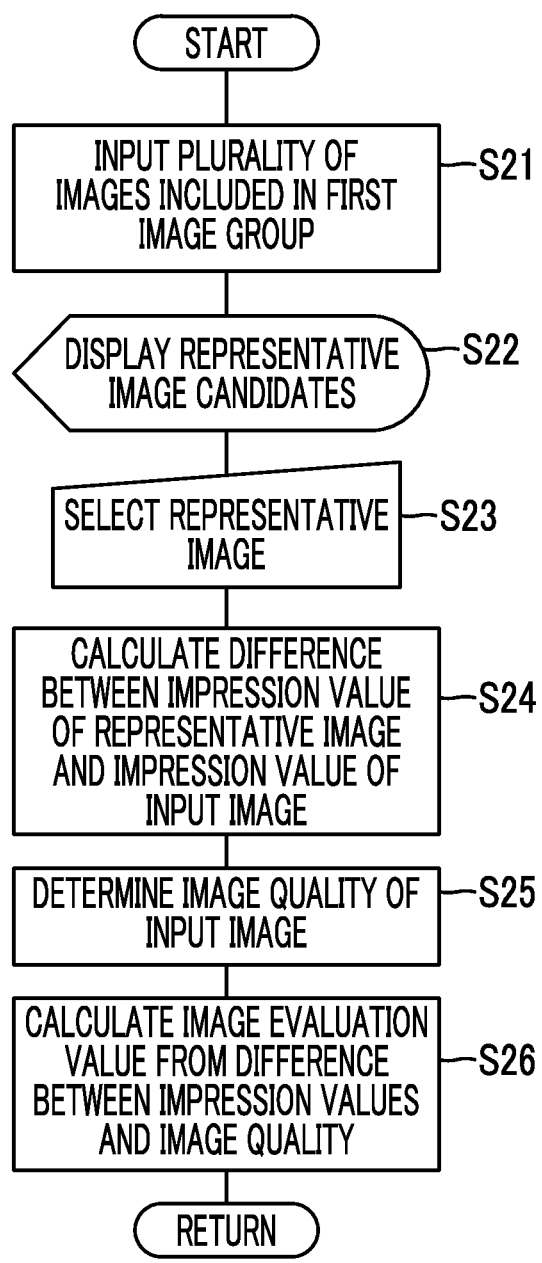
FIG. 2 is a flowchart showing the processing procedure of the image evaluation apparatus.

FIG. 2 is a flowchart showing the processing procedure of the image evaluation apparatus 1.

The user loads the memory card 14, in which a plurality of images (files indicating a plurality of images) are stored, into the image evaluation apparatus 1 to input a plurality of images included in a first image group to the image evaluation apparatus 1 through the memory card interface 13 (a first image input device) (step 21). All the images stored in the memory card 14 may be regarded as the first image group. In a case where a plurality of folders are formed on the memory card 14, one of the plurality of folders may be designated, and a plurality of images stored in the designated folder may be regarded as the first image group. Needless to say, instead of the images stored in the memory card 14, images stored in the compact disc 5 may be regarded as the first image group, or a plurality of images stored in the HD 12 may be regarded as the first image group.

In a case where a plurality of images included in the first image group are input to the image evaluation apparatus 1 (are designated), a plurality of representative image candidates are displayed on the display screen of the display device 2 under the control of the display control device 3 (step 22).

Figure 3:
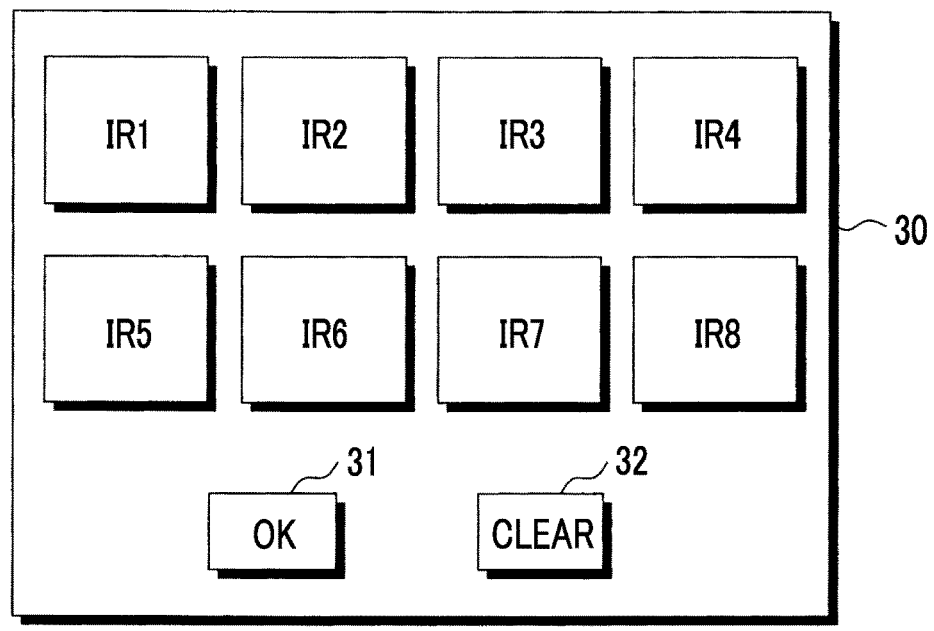
FIG. 3 is an example of a representative image candidate.

FIG. 3 is an example of a window 30 displayed on the display screen of the display device 2.

Eight representative image candidates IR1 to IR8 are displayed on the window 30. The representative image candidates IR1 to IR8 are stored in advance in the HD 12. Although the representative image candidates IR1 to IR8 are different from the plurality of images read from the memory card 14, representative image candidates may be determined from the plurality of images read from the memory card 14. Instead of the plurality of images read from the memory card 14, any image owned by the user may be read by the image evaluation apparatus 1, and the read images may be used as representative image candidates. In FIG. 3, the eight representative image candidates IR1 to IR8 are displayed. However, the number is not limited to eight, and seven or less representative image candidates may be displayed or nine or more representative image candidates may be displayed as long as the number is plural.

Below the representative image candidates IR1 to IR8, an OK button 31 with the characters "OK" and a clear button 32 with the characters "Clear" are formed.

The user selects one or a plurality of representative images having user's favorite impressions among the eight representative image candidates IR1 to IR8 displayed on the window 30 (step 23 in FIG. 2). For example, a cursor is positioned on a desired representative image candidate, among the representative image candidates IR1 to IR8, and clicked using the mouse 9 (a representative image selection device) and the OK button 31 is clicked using the mouse 9, so that the clicked representative image candidate is selected as a representative image. In a case where the clear button 32 is clicked using the mouse 9 before the OK button 31 is clicked, the clicked representative image candidate is cleared.

Then, the CPU 7 calculates a difference between the impression value of the selected representative image and the impression value of each of the plurality of images input to the image evaluation apparatus 1 (step 24).

Figure 4:
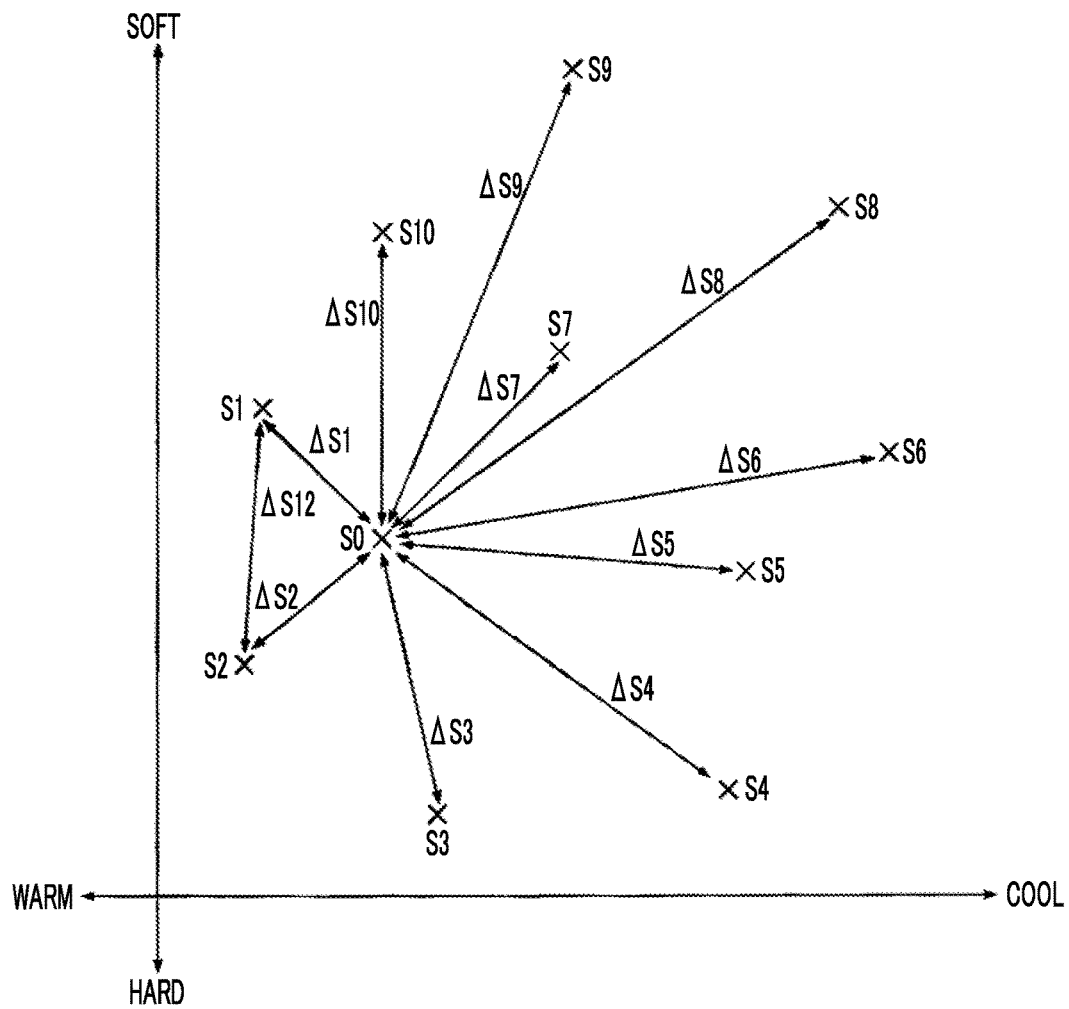
FIG. 4 is an example of an impression region.

FIG. 4 is an example of an impression region expressed by the impression axis.

The horizontal axis is an impression axis defined by the impression of "warm" and the impression of "cool", and the vertical axis is an impression axis defined by the impression of "soft" and the impression of "hard".

In the present embodiment, it is assumed that ten images of images I1 to I10 are input to the image evaluation apparatus 1 as a plurality of images included in the first image group. Impression values in the impression regions of the images I1 to I10 are indicated by S1 to S10. In a case where the impression values S1 to S10 of the images I1 to I10 are stored in the header of an image file indicating each of the images I1 to I10, the impression values may be read from the image file. In a case where no impression value is stored in the header of the image file, for example, a representative color is determined from the color distribution of each of the images I1 to I10, and an impression value corresponding to "warm" and "cool" and an impression value corresponding to "soft" and "hard" are determined for the determined representative color. It is needless to say that an impression value corresponding to "warm" and "cool" and an impression value corresponding to "soft" and "hard" are determined in advance for each color. A representative color can be determined by the most frequent color in the image, the average color of the main subject in the image, and the like. Alternatively, a plurality of representative colors, such as a first representative color and a second representative color, may be determined, and an impression value may be calculated by a combination of representative colors.

FIG. 4 also shows an impression value S0 of the representative image selected by the user. In the present embodiment, it is assumed that one representative image is selected. However, a plurality of representative images may be selected. It is needless to say that an impression value for the impression axis is stored in the header of a representative image file indicating a representative image and the impression value is read from the header.

In FIG. 4, an impression value for two impression axes is used. However, an impression value for one impression axis and an impression value for three or more impression axes may be used.

In a case where the impression value S0 of the representative image and the impression values S1 to S10 of the images I1 to I10 input to the image evaluation apparatus 1 are known, the difference between the impression value of the representative image and each of the impression values S0 to S10 of the images I1 to I10 input to the image evaluation apparatus 1 is calculated by the CPU 7 (step 24 in FIG. 2). This difference is expressed as a distance of the impression value in the impression region in FIG. 4. The distance between the impression value S1 of the image I1 and the impression value S0 of the representative image is ΔS1, and the distance is the difference. Similarly, differences between the impression value S0 of the representative image and the impression value S2 of the image I2, the impression value S3 of the image I3, the impression value S4 of the image I4, the impression value S5 of the image I5, the impression value S6 of the image I6, the impression value S7 of the image I7, the impression value S8 of the image I8, the impression value S9 of the image I9, and the impression value S10 of the image I10 are ΔS2, ΔS3, ΔS4, ΔS5. ΔS6, ΔS7, ΔS8, ΔS9, and ΔS10, respectively.

Then, the image quality of each of the plurality of images input to the image evaluation apparatus 1 is determined as an image quality evaluation value by the CPU 7 (step 25 in FIG. 2). The image quality is defined without depending on the subjectivity, and refers to the attribute of the image that the larger the better or the smaller the better. For example, the degree of blurring of the image, the contrast, the number of pixels, the resolution, the brightness, and the like are included, but the present invention is not limited thereto. In a case where the image quality evaluation value is stored in the header of the image file indicating the image, the image quality evaluation value is read from the header. In a case where the image quality evaluation value is not stored in the header of the image file, the image quality evaluation value is determined by the CPU 7.

In a case where the difference between the impression values and the image quality of the image are determined, an image evaluation value is calculated from the difference between the impression values and the image quality of the image by the CPU 7 (a first image evaluation value calculation device) (step 26). The image evaluation value is obtained by dividing the difference between the impression values by the image quality of the image. It is needless to say that both the difference between the impression values and the image quality of the image are standardized. The higher the image quality, the higher the image evaluation value. In addition, the difference between the impression values becomes smaller as the similarity to the impression of the favorite representative image selected by the user becomes higher. Therefore, the smaller the difference between the impression values, the higher the image evaluation value.

Table 1 is an example of an image evaluation value table in which an image quality evaluation value, a distance from the impression value S0 of the representative image to the impression value of each of a plurality of images input to the image evaluation apparatus 1 (difference between the impression values), and an image evaluation value are stored for each image.

TABLE 1

| Image | Image quality evaluation value | Distance from impression value of representative image | Image evaluation value |
| --- | --- | --- | --- |
| I1 | Q1 | ΔS1 | Q1/ΔS1 |
| I2 | Q2 | ΔS2 | Q2/ΔS2 |
| I3 | Q3 | ΔS3 | Q3/ΔS3 |
| I4 | Q4 | ΔS4 | Q4/ΔS4 |
| | | | |
| | | | |
| | | | |

For example, in the case of the image I1, the image quality evaluation value is Q1, and the distance from the impression value S0 of the representative image to the impression value S1 of the image I1 is ΔS1. Therefore, the image evaluation value is Q1/ΔS1. For the other images I2 to I10, the image evaluation value is similarly calculated by the CPU 7.

In a case where the image evaluation value is obtained in this manner, a postcard, a photobook, and the like are created using images having high image evaluation values, so that it is possible to create a postcard, a photobook, and the like with high image quality and user's favorite impression.

FIG. 5 shows a modification example, and is a flowchart showing a part of the processing procedure of the image evaluation apparatus 1. FIG. 5 corresponds to FIG. 2.

A plurality of images included in the first image group are input from the memory card 14 to the image evaluation apparatus 1 through the memory card interface 13 (a first image input device) (step 41). For example, as shown as the impression values S1 to S10 of the input images I1 to I10 in FIG. 4, it is assumed that the images I1 to I10 are input to the image evaluation apparatus 1. The image quality of each of the plurality of images I1 to I10 input to the image evaluation apparatus 1 is determined by the CPU 7 (step 42). An image having an image quality equal to or higher than a threshold value, among the plurality of images I1 to I10 input to the image evaluation apparatus 1, is found by the CPU 7, and the found image is determined as a representative image candidate by the CPU 7 (step 43). The image having an image quality equal to or higher than a threshold value refers to an image having an image quality evaluation value equal to or higher than a threshold value indicating that the image quality is good, and refers to an image having an image quality equal to or higher than a predetermined level.

Among the plurality of images I1 to I10 included in the first image group input to the image evaluation apparatus 1, images having image qualities equal to or higher than the threshold value are displayed on the display screen of the display device 2 as shown in FIG. 3, as representative image candidates, by the display control device 3 (a representative image candidate display control device) (step 44).

Among the images having image qualities equal to or higher than the threshold value that are displayed as representative image candidates on the display screen of the display device 2 by the display control device 3, at least one representative image candidate is selected as a representative image by the mouse 9 (a representative image selection device).

It is possible to select a representative image from representative image candidates having a good image quality.

FIG. 6 shows a modification example, and is a flowchart showing a part of the processing procedure of the image evaluation apparatus 1. FIG. 6 also corresponds to FIG. 2.

A plurality of images included in the first image group are input from the memory card 14 to the image evaluation apparatus 1 through the memory card interface 13 (a first image input device) (step 51). For example, as shown as the impression values S1 to S10 of the input images I1 to I10 in FIG. 4, it is assumed that the images I1 to I10 are input to the image evaluation apparatus 1. Among the plurality of images I1 to I10 input to the image evaluation apparatus 1, a variation in impression value is determined by the CPU 7 (step 52). In a case where a combination of any two of the plurality of images I1 to I10 input to the image evaluation apparatus 1 is considered, the variation in impression value is a difference between the impression values of the two images (distance in the impression region). For example, the variation in impression value between the images I1 and I2 is a difference between the impression value S1 of the image I1 and the impression value S2 of the image I2 (distance ΔS12 in the impression region). The same applies to the other images.

In a case where the variation in impression value is determined, a plurality of images having a large variation in impression value are determined as representative image candidates by the CPU 7 (step 53). The plurality of images having a large variation in impression value refer to a plurality of images having a variation in impression value equal to or higher than the threshold value among the plurality of images input to the image evaluation apparatus 1, a plurality of images of a predetermined number or a predetermined proportion in descending order of variation in impression value among the plurality of images input to the image evaluation apparatus 1, and the like.

Among the plurality of images included in the first image group input to the image evaluation apparatus 1, a plurality of images with a large variation in impression value are displayed on the display screen of the display device 2 as shown in FIG. 3, as representative image candidates, by the display control device 3 (a representative image candidate display control device) (step 54). For example, assuming that variations in the impression values S3 and S9, S2 and S8, and S1 and S4 are large, the images I1 to I4, I8, and I9 corresponding to the impression values S1 to S4, S8, and S9 become representative image candidates.

Among the images having image qualities equal to or higher than the threshold value that are displayed as representative image candidates on the display screen of the display device 2 by the display control device 3, at least one representative image candidate is selected as a representative image by the mouse 9 (a representative image selection device).

Since a plurality of images with a large variation in impression value are images having various impressions, a possibility that an image having an impression that the user himself or herself desires will be displayed is increased by displaying such an image as a representative image candidate. The user can select an image matching the user's sensitivity as a representative image, and therefore, it is possible to increase the evaluation value of the image matching the user's sensitivity.

FIG. 7 shows a modification example, and is a flowchart showing a part of the processing procedure of the image evaluation apparatus 1. FIG. 7 also corresponds to FIG. 2.

A plurality of images included in the first image group are input from the memory card 14 to the image evaluation apparatus 1 through the memory card interface 13 (a first image input device) (step 61). Also in this case, as shown as the impression values S1 to S10 of the input images I1 to I10 in FIG. 4, it is assumed that the images I1 to I10 are input to the image evaluation apparatus 1. Among the plurality of images I1 to I10 input to the image evaluation apparatus 1, images having a maximum impression value and a minimum impression value are found by the CPU 7 for a plurality of impression axes (one impression axis may be used) (step 62). The found images are determined as representative image candidates by the CPU 7. Referring to FIG. 4, the maximum impression value on the impression axis of the horizontal axis defined by "warm" and "cool" is S6, and the minimum impression value is S2. In addition, the maximum impression value among the impression values on the vertical axis defined by "soft" and "hard" is S9, and the minimum impression value is S3. The images I2, I3, I6, and I9 corresponding to the impression values S2, S3, S6, and S9 are determined as representative image candidates.

Among the plurality of images included in the first image group input to the image evaluation apparatus 1, images having a maximum impression value and a minimum impression value for a plurality of impression axes are displayed on the display screen of the display device 2 as shown in FIG. 3, as representative image candidates, by the display control device 3 (a representative image candidate display control device) (step 64).

Among the images having image qualities equal to or higher than the threshold value that are displayed as representative image candidates on the display screen of the display device 2 by the display control device 3, the user selects at least one representative image candidate as a representative image using the mouse 9 (a representative image selection device).

The image having a maximum impression value and the image having a minimum impression value show noticeable impressions among the input images. Therefore, by displaying such an image as a representative image candidate, the user can easily select an image showing a noticeable impression from the images owned by the user. As a result, it is possible to increase the evaluation value of the image that matches the user's sensitivity.

In the embodiment described above, an image having a maximum impression value and an image having a minimum impression value are taken as representative image candidates. However, a plurality of images may be found in descending order and ascending order of impression value for a plurality of impression axes until a predetermined number of images or a predetermined proportion of images among the images input to the image evaluation apparatus 1 are obtained, and the found images may be used as representative image candidates. In addition, an image having an impression value close to an intermediate impression value between the maximum impression value and the minimum impression value may be included in the representative image candidates.

In this case, since images having various impressions become representative image candidates, the user can easily select an image having his or her desired impression as a representative image.

Second Embodiment

FIGS. 8 to 16 show a second embodiment.

Figure 9:
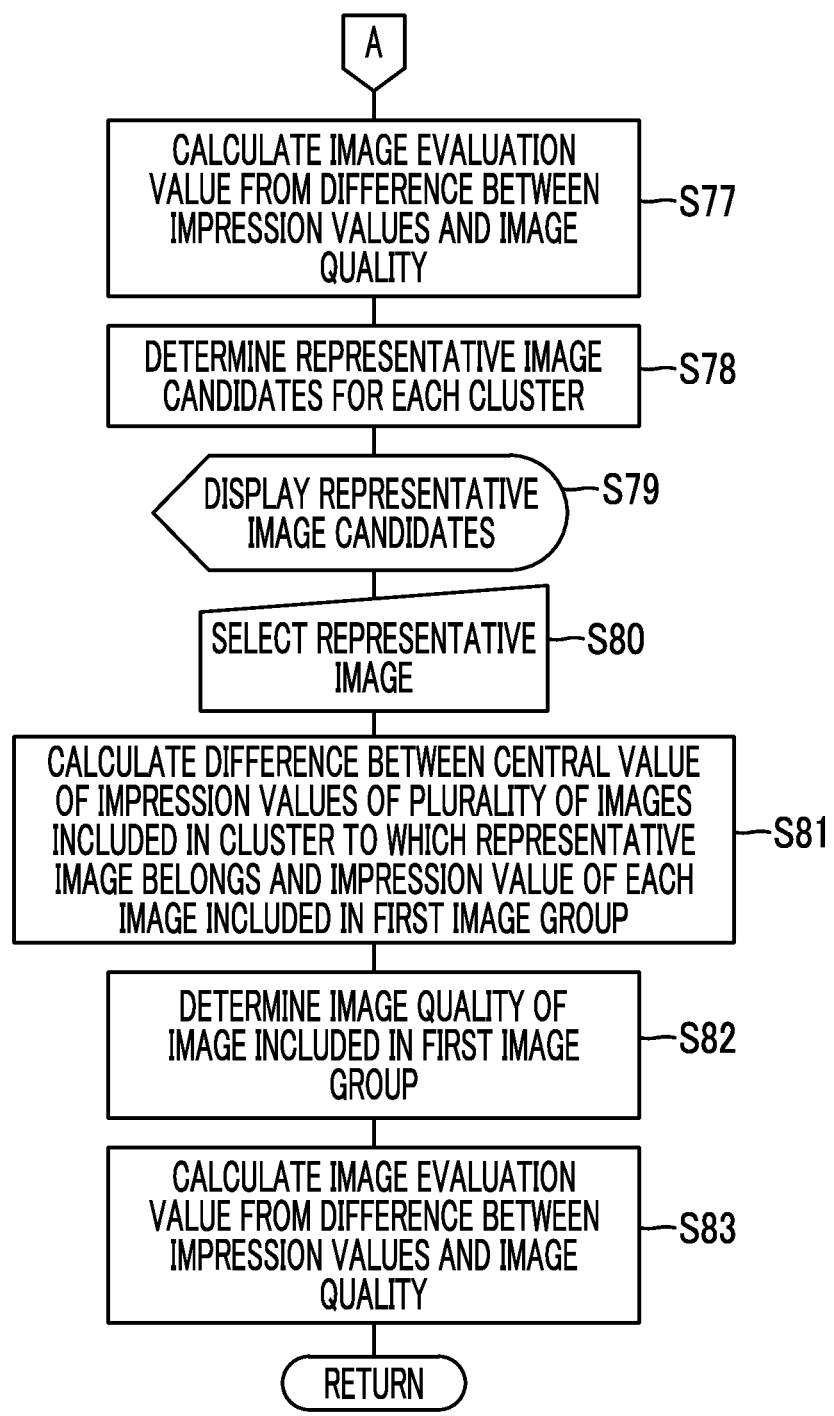
FIG. 9 is a flowchart showing the processing procedure of the image evaluation apparatus.

FIGS. 8 and 9 are flowcharts showing the processing procedure of the image evaluation apparatus 1.

In the present embodiment, not only the plurality of images included in the first image group but also a plurality of images included in a second image group are input to the image evaluation apparatus 1. The plurality of images included in the first image group are images for which image evaluation values are to be calculated, and the plurality of images included in the second image group are images for determining a representative image.

It is assumed that a plurality of folders are included in the memory card 14 and a plurality of images are stored in each of the plurality of folders. In a case where such a memory card 14 is loaded into the image evaluation apparatus 1 and a first folder including a plurality of images to be evaluated is designated by the user, the plurality of images stored in the designated first folder are input to the image evaluation apparatus 1 through the memory card interface 13 (a first image input device) as a plurality of images included in the first image group (step 71). Then, among the plurality of folders stored in the memory card 14, a second folder different from the first folder designated by the user (may be the same as the first folder) is designated by the user. A plurality of images stored in the designated second folder are input to the image evaluation apparatus 1 through the memory card interface 13 (a second image input device) as a plurality of images included in the second image group (step 72).

It is assumed that the plurality of images included in the first image group are nine images I51 to I59. It is assumed that the impression values of the images I51 to I59 are S51 to S59. It is assumed that the plurality of images included in the second image group are 15 images of images I21 to I25, images I31 to I35, and images I41 to I45. It is assumed that the impression values of the images I21 to I25 are S21 to S25, the impression values of the images I31 to I35 are S31 to S35, and the impression values of the images I41 to I45 are S41 to S45.

Figure 10:
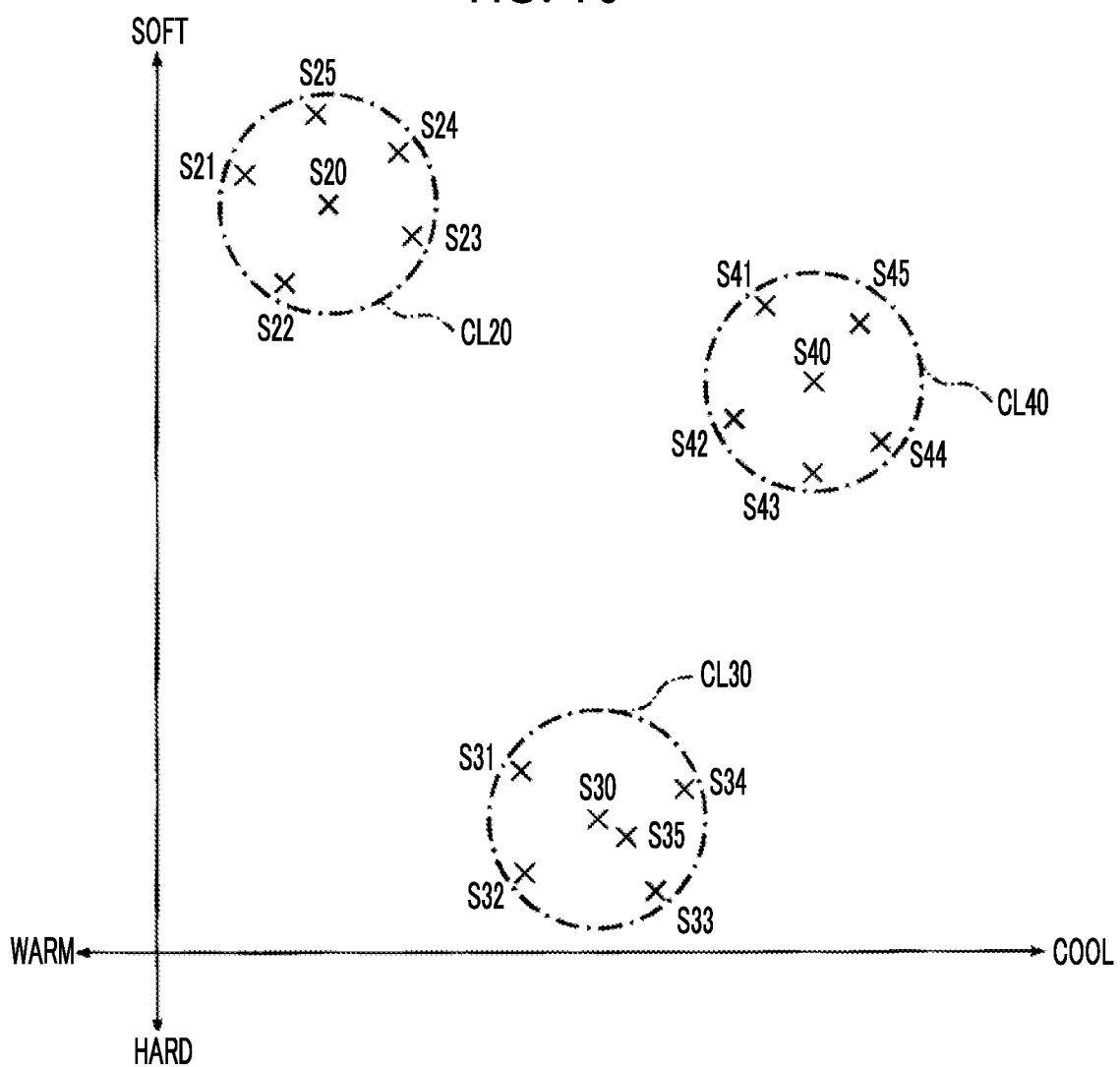
FIG. 10 is an example of an impression region.

FIG. 10 corresponds to FIG. 4, and is an example of an impression region.

Also in the impression region shown in FIG. 10, similarly to the impression region shown in FIG. 4, the horizontal axis is an impression axis defined by the impression of "warm" and the impression of "cool", and the vertical axis is an impression axis defined by the impression of "soft" and the impression of "hard".

The impression values S21 to S25, S31 to S35, and S41 to S45 corresponding to the images I21 to I25, the images I31 to I35, and the images I41 to I45 included in the second image group are distributed in the impression region shown in FIG. 10. The impression values S21 to S25, S31 to S35, and S41 to S45 distributed in the impression region are classified into a plurality of clusters CL20, CL30, and CL40 by the CPU 7. The impression values S21 to S25 are included in the cluster CL20, the impression values S31 to S35 are included in the cluster CL30, and the impression values S41 to S45 are included in the cluster CL40. In a case where the distance between impression values adjacent to each other is less than the threshold value, such impression values are included in the same cluster. In a case where the distance between impression values adjacent to each other is equal to or greater than the threshold value, such impression values are classified into different clusters. The images I21 to I25 corresponding to the impression values S21 to S25 included in the cluster CL20, the images I31 to I35 corresponding to the impression values S31 to S35 included in the cluster CL30, and the images I41 to I45 corresponding to the impression values S41 to S45 included in the cluster CL40 are classified into different clusters. Hereinafter, the images I21 to I25 corresponding to the impression values S21 to S25 included in the cluster CL20 are also referred to as images included in the cluster CL20. Similarly, the images I31 to I35 corresponding to the impression values S31 to S35 included in the cluster CL30 are also referred to as images included in the cluster CL30, and the images I41 to I45 corresponding to the impression values S41 to S45 included in the cluster CL40 are also referred to as images included in the cluster CL40. In this manner, based on the impression values of the plurality of images included in the second image group, the plurality of images included in the second image group are classified into a plurality of clusters CL20, CL30, and CL40 by the CPU 7 (an image classification device) (step 73 in FIG. 8).

Then, central values of the impression values of the plurality of images I21 to I25, I31 to I35, and I41 to I45 included in the plurality of clusters CL20, CL30, and CL40 are calculated by the CPU 7 (step 74 in FIG. 8). The central value of the impression values S21 to S25 of the plurality of images included in the cluster CL20 is expressed as S20, the central value of the impression values S31 to S35 of the plurality of images included in the cluster CL30 is expressed as S30, the central value of the impression values S41 to S45 of the plurality of images included in the cluster CL40 is expressed as S40. The central value can be calculated by weighted average of the impression values S21 to S25, S31 to S35, and S41 to S45 included in the respective clusters CL20, CL30, and CL40 (all weighting coefficients are 1, but weighting coefficients may be changed according to the impression value).

In a case where the central value of the impression value is calculated, the difference between the central value and the impression value of the image included in the cluster is calculated by the CPU 7 (step 75).

Figure 11:
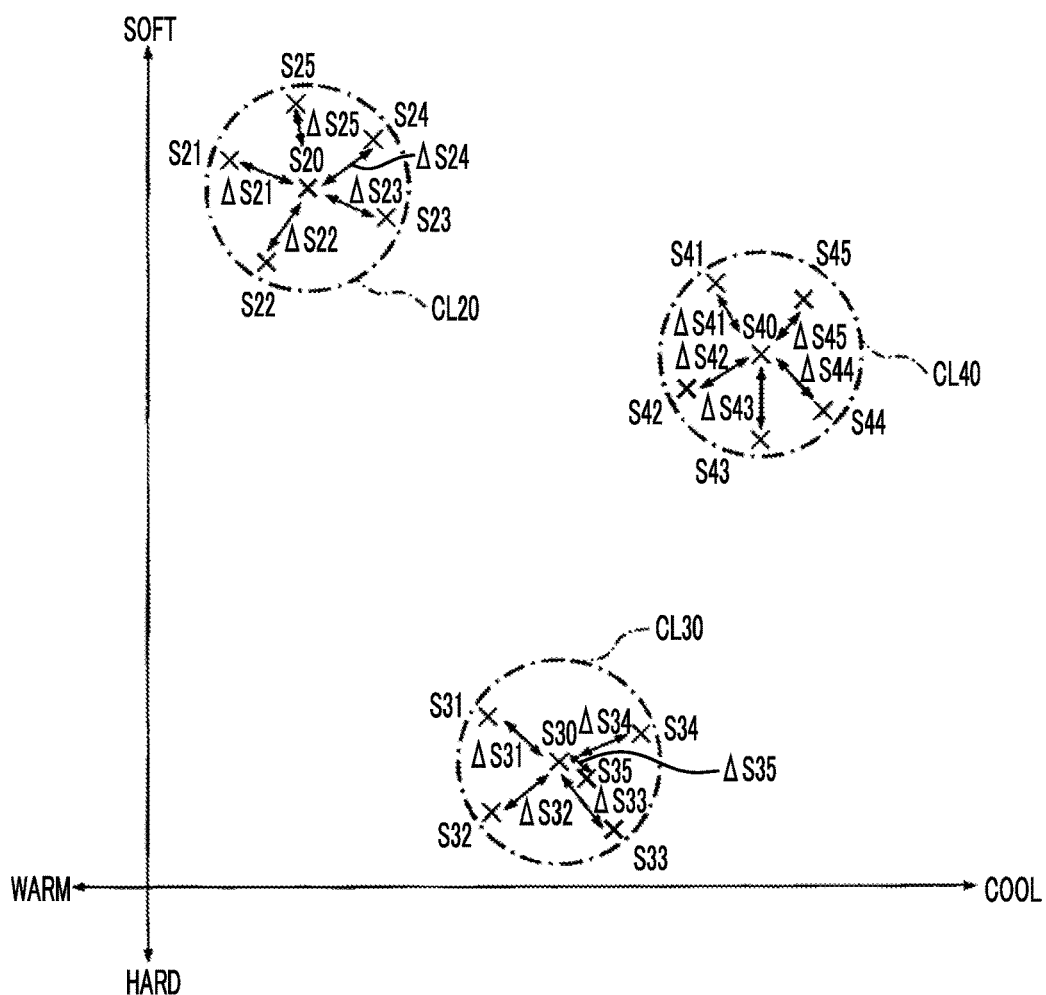
FIG. 11 is an example of an impression region.

FIG. 11 shows a difference between the central value of a cluster and the impression value of an image included in the cluster.

The difference between the central value S20 of the cluster CL20 and the impression value S21 of the image I21 is $\Delta S21$. Similarly, the difference between the central value S20 of the cluster CL20 and the impression value S22 of the image I22, the difference between the central value S20 of the cluster CL20 and the impression value S23 of the image I23, the difference between the central value S20 of the cluster CL20 and the impression value S24 of the image I24, and the difference between the central value S20 of the cluster CL20 and the impression value S25 of the image I25 are $\Delta S22$, $\Delta S23$, $\Delta S24$, and $\Delta S25$, respectively.

The difference between the central value S30 of the cluster CL30 and the impression value S31 of the image I31 is $\Delta S31$. Similarly, the difference between the central value S30 of the cluster CL30 and the impression value S32 of the image I32, the difference between the central value S30 of the cluster CL30 and the impression value S33 of the image I33, the difference between the central value S30 of the cluster CL30 and the impression value S34 of the image I34, and the difference between the central value S30 of the cluster CL30 and the impression value S35 of the image I35 are ΔS32, ΔS33, ΔS34, and ΔS35, respectively.

The difference between the central value S40 of the cluster CL40 and the impression value S41 of the image I41 is ΔS41. Similarly, the difference between the central value S40 of the cluster CL40 and the impression value S42 of the image I42, the difference between the central value S40 of the cluster CL40 and the impression value S43 of the image I43, the difference between the central value S40 of the cluster CL40 and the impression value S44 of the image I44, and the difference between the central value S40 of the cluster CL40 and the impression value S45 of the image I45 are ΔS42, ΔS43, ΔS44, and ΔS45, respectively.

Then, the image quality (image quality evaluation value) of the image included in the cluster is determined by the CPU 7 (step 76).

In a case where the difference between the impression values and the image quality are determined, an image evaluation value is calculated from the obtained difference between the impression values and the obtained image quality by the CPU 7 (a second image evaluation value calculation device) (step 77 in FIG. 9).

Table 2 shows image evaluation values and the like of the images I21 to I25, the images I31 to I35, and the images I41 to I45 included in the second image group.

TABLE 2

| Image | Cluster | Image quality evaluation value | Distance from central value of cluster | Image evaluation value |
|---|---|---|---|---|
| I21 | CL20 | Q21 | ΔS21 | Q21/ΔS21 |
| I22 | CL20 | Q22 | ΔS22 | Q22/ΔS22 |
| | | | | | | | | | |
| I31 | CL30 | Q31 | ΔS31 | Q31/ΔS31 |
| I32 | CL30 | Q32 | ΔS32 | Q32/ΔS32 |
| | | | | | | | | | |
| I41 | CL40 | Q41 | Δ41 | Q41/ΔS41 |
| I42 | CL40 | Q42 | ΔS42 | Q42/ΔS42 |
| | | | | | | | | | |

As described above, the images I21 to I25 are classified into the cluster CL20, the images I31 to I35 are classified into the cluster CL30, and the images I41 to I45 are classified into the cluster CL40. The image evaluation value of the image I21 is Q21, and the distance from the central value S20 of the cluster CL20, to which the image I21 belongs, to the image 121 (difference between the impression values) is ΔS21. The image evaluation value is obtained by dividing the image quality evaluation value by the distance from the central value of the cluster. Accordingly, the image evaluation value is Q21/ΔS21. Image evaluation values are similarly calculated for images other than the image I21 and stored in Table 2. In a case where the difference between the central value of the impression values of a plurality of images included in a cluster and the impression value of each image included in the cluster is large, the image evaluation value is calculated to be lower than in a case where the difference is small. In addition, in a case where the image quality of the image included in the cluster is poor, the image evaluation value is calculated to be lower than in a case where the image quality is good.

In a case where the image evaluation values for the images I21 to I25, the images I31 to I35, and the images I41 to I45 included in the second image group are calculated, representative image candidates are determined based on the calculated image evaluation values for each cluster by the CPU 7 (a representative image candidate determination device) (step 78 in FIG. 9). An image having a high image evaluation value among the images included in the cluster is determined as a representative image candidate for each cluster. The image evaluation value is obtained by dividing the image quality evaluation value by the central value of the cluster (impression value of the center of the cluster). The image evaluation value becomes higher as the image quality evaluation value becomes higher, and becomes higher as the impression value becomes closer to the central value of the cluster. An image that has a high image quality and representatively shows an impression of each image included in a cluster is a representative image candidate. For example, the image I24 is determined as a first representative image candidate among the images I21 to I25 included in the cluster CL20, the image I35 is determined as a second representative image candidate among the images I31 to I35 included in the cluster CL30, and the image I45 is determined as a third representative image candidate among the images I41 to I45 included in the cluster CL40.

In a case where representative image candidates are determined for each cluster, the determined representative image candidates are displayed on the display screen of the display device 2 under the control of the display control device 3 (a representative image candidate display control device) (step 79 in FIG. 9).

Figure 12:
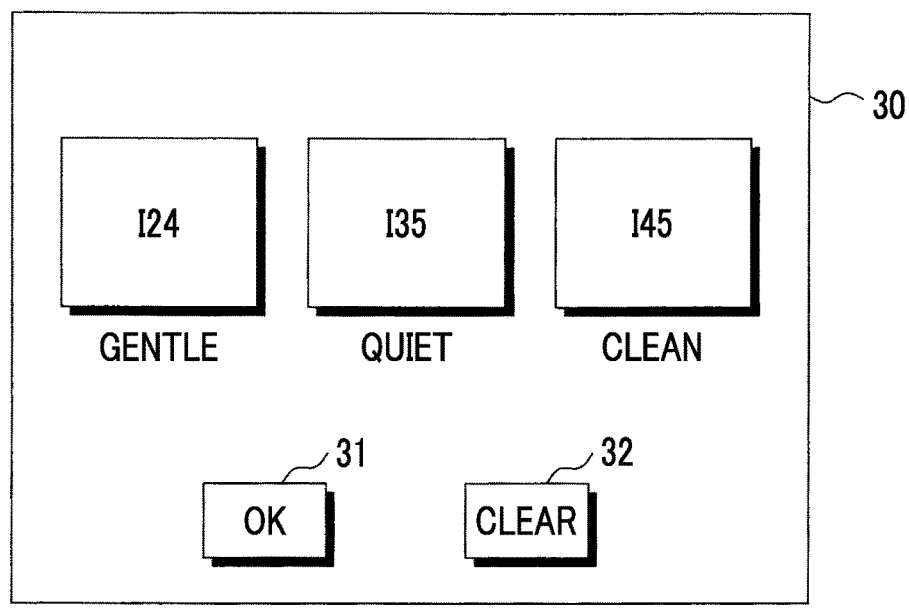
FIG. 12 is an example of a representative image candidate.

FIG. 12 is an example of the window 30 displayed on the display screen of the display device 2.

The images I24, I35, and I45 as representative image candidates determined as described above are displayed on the window 30. A sensitivity word (word) "gentle" indicating the impression of the image I24 is displayed below the image I24. Similarly, a sensitivity word "quiet" indicating the impression of the image I35 as a representative image candidate is displayed below the image I35 as a representative image candidate, and a sensitivity word "clean" indicating the impression of the image I45 as a representative image candidate is displayed below the image I45 as a representative image candidate under the control of the display control device 3. In a case where the sensitivity words are stored in advance in the headers of the image files of the images I24, I35, and I45, the sensitivity words are read from the headers. In a case where the sensitivity words are not stored in the headers of the image files, an impression region where the sensitivity words are distributed is used. By reading the sensitivity words corresponding to the impression values S24, S35, and S45 of the representative image candidates from the impression region where the sensitivity words are distributed, the sensitivity words corresponding to the representative image candidates are obtained and displayed below the corresponding images as shown in FIG. 12. The user can relatively easily grasp what kind of impression the image displayed as a representative image candidate has by viewing the sensitivity word. Sensitivity words corresponding to the impressions of the representative image candidates IR1 to IR8 may also be displayed below the representative image candidates IR1 to IR8 stored in advance as shown in FIG. 3.

Below the images I24, I35, and I45 as representative image candidates, the OK button 31 with the characters "OK" and the clear button 32 with the characters "Clear" are formed.

In a case where one of the images I24, I35, and I45 as representative image candidates is clicked by the mouse 9 (a representative image selection device) and the OK button 31 is clicked, the clicked image is selected as a representative image (step 80). Here, it is assumed that the image I24 is selected as a representative image.

In a case where the representative image is selected, the difference between the central value of the impression values of a plurality of images included in the cluster to which the selected representative image belongs and the impression value of each of the plurality of images included in the first image group is calculated (step 81 in FIG. 9).

Figure 13:
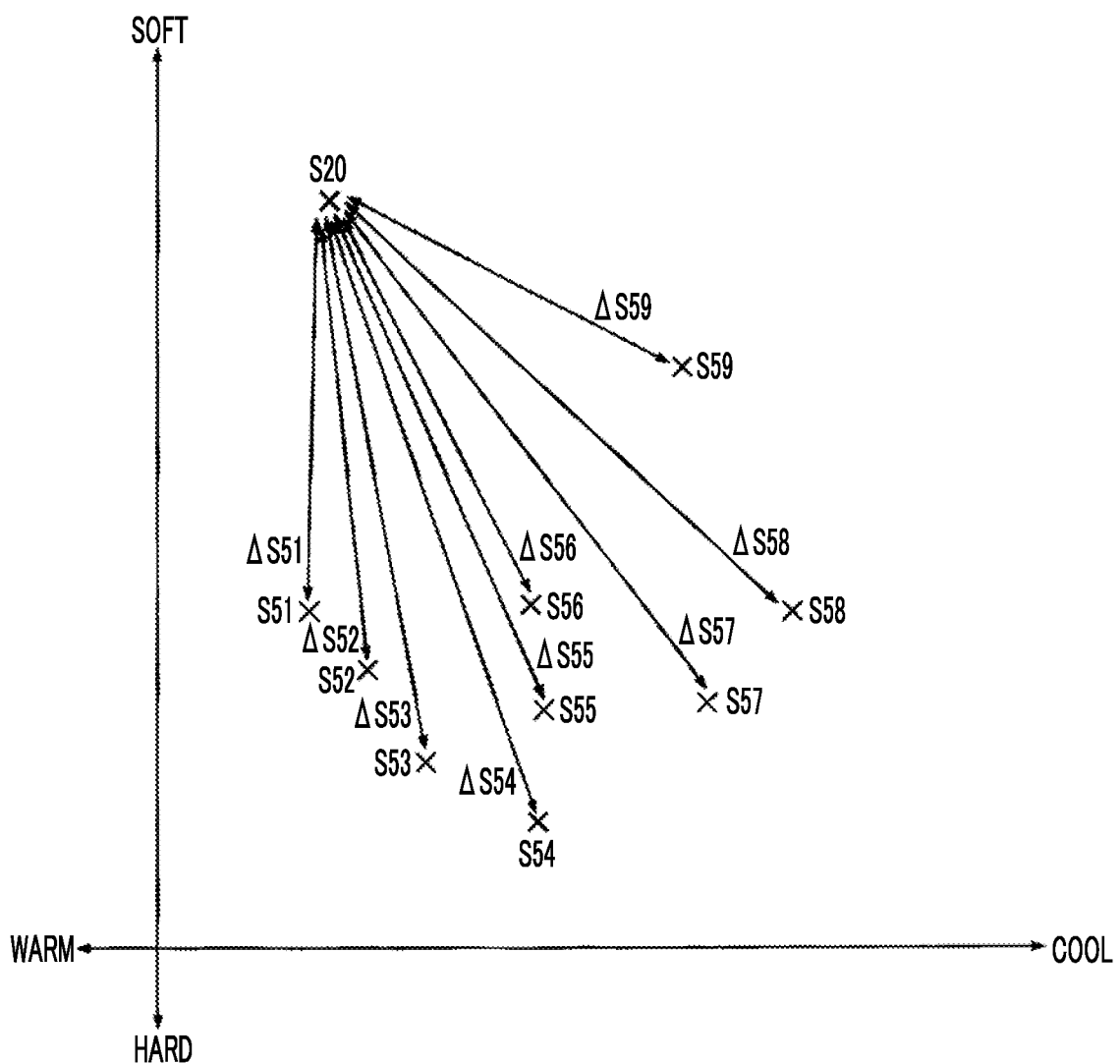
FIG. 13 is an example of an impression region.

FIG. 13 corresponds to FIGS. 10 and 11, and is an example of an impression region.

Also in FIG. 13, similarly to FIGS. 10 and 11, the horizontal axis is an impression axis defined by the impression of "warm" and the impression of "cool", and the vertical axis is an impression axis defined by the impression of "soft" and the impression of "hard".

In FIG. 13, the central value S20 of the cluster CL20 to which the image I24 selected as a representative image belongs and the impression values S51 to S59 of the plurality of images I51 to I59 included in the second group are also shown.

Differences between the central value S20 of the cluster CL20 and the impression values S51 to S59 (distances from the central value S20) are expressed as ΔS51 to ΔS59. Such differences are calculated by the CPU 7.

In addition, the image quality (image quality evaluation value) of each of the images I51 to I59 included in the first group is determined by the CPU 7 (step 82 in FIG. 9).

In a case where the differences between the central value S20 of the cluster CL20 and the impression values S51 to S59 and the image quality of each of the images I51 to I59 are obtained, the CPU 7 calculates an image evaluation value based on the obtained differences and image quality (step 83 in FIG. 9).

Table 3 is a table in which image evaluation values and the like for the images I51 to I59 included in the first image group are stored.

TABLE 3

| Image | Image quality evaluation value | Distance from selected central value | Image evaluation value |
|---|---|---|---|
| I51 | Q51 | ΔS51 | Q51/ΔS51 |
| I52 | Q52 | ΔS52 | Q52/ΔS52 |
| I53 | Q53 | ΔS53 | Q53/ΔS53 |
| ⋮ | ⋮ | ⋮ | ⋮ |
| I58 | Q58 | ΔS58 | Q58/ΔS58 |
| I59 | Q59 | ΔS59 | Q59/ΔS59 |

The image quality evaluation value of the image I51 is Q51, and the distance from the selected central value S20 to the impression value S51 of the image I51 (difference between the impression values) is ΔS51. Since the image evaluation value is obtained by dividing the image quality evaluation value by the distance from the selected central value to the impression value of the image to be evaluated, the image evaluation value of the image I51 is Q51/ΔS51. For the other images I51 to I59, the image evaluation value is similarly calculated by the CPU 7. As the image quality of the image becomes higher (as the image quality evaluation value becomes higher), the image evaluation value becomes higher. In addition, as the distance from the selected central value S20 becomes smaller (as the difference between the impression values becomes smaller), the image evaluation value becomes higher since it can be thought that the image has an impression close to that desired by the user.

A representative image can be selected using images owned by the user, and the image evaluation value can be calculated using the selected representative image.

In the embodiment described above, a plurality of images included in the first image group and a plurality of images included in the second image group are stored in the same memory card 14. However, the images included in the first image group of and the images included in the second image group may be stored in different recording media.

Figure 14:
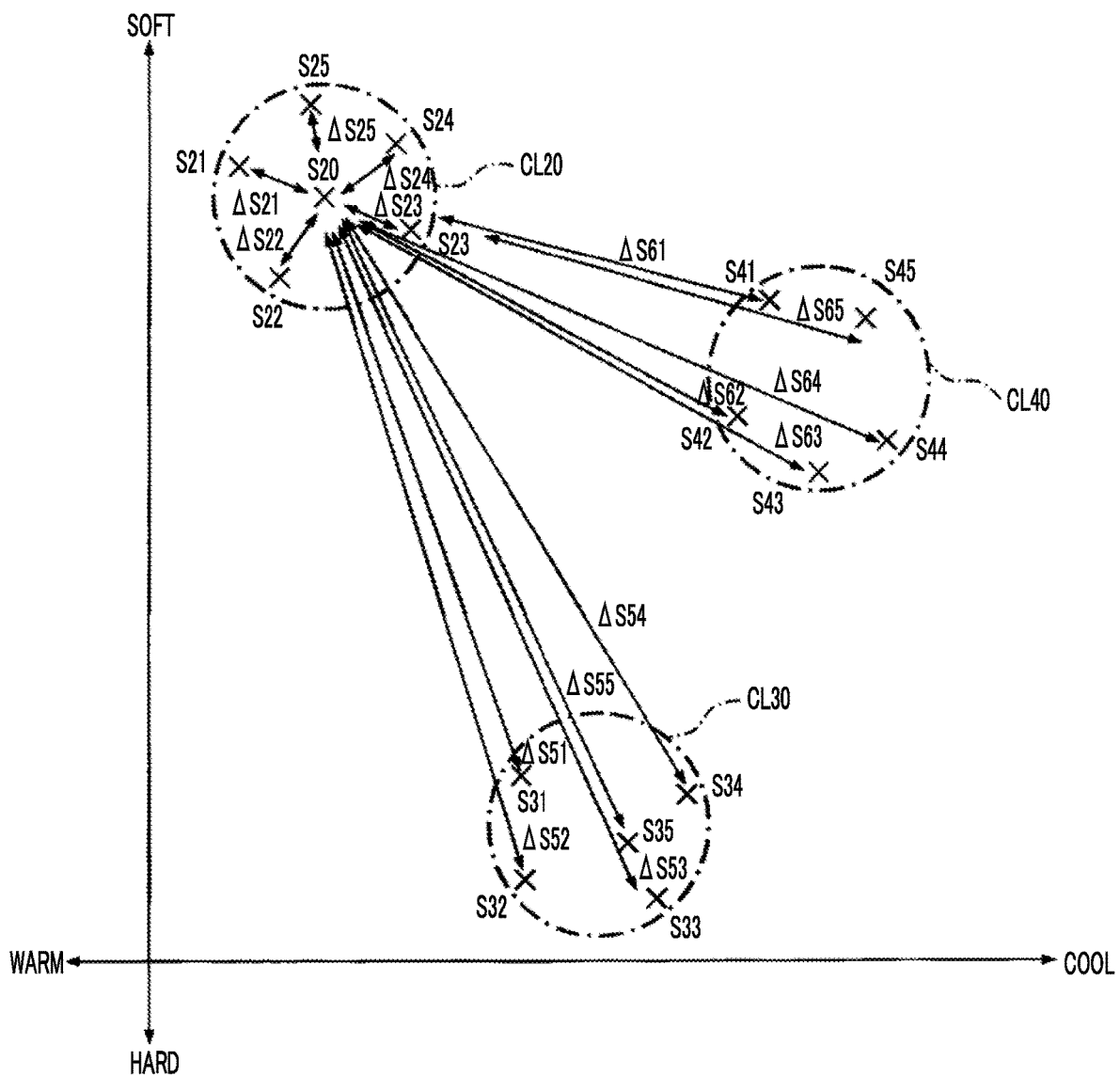
FIG. 14 is an example of an impression region.

FIG. 14 shows a modification example, and is an example of an impression region. FIG. 14 corresponds to FIG. 13.

In the embodiment described above, the first image group and the second image group are different image groups. In this modification example, however, the first image group and the second image group are the same image group.

It is assumed that the first image group includes the images I21 to I25, I31 to I35, and I41 to I45 corresponding to the impression values S21 to S25, S31 to S35, and S41 to S45. In FIG. 14, the impression values S21 to S25, S31 to S35, and S41 to S45 are distributed.

It is assumed that the images I21 to I25 are classified into the cluster CL20, the images I31 to I35 are classified into the cluster CL30, and the images I41 to I45 are classified into the cluster CL40. The image I24 is determined as a representative image candidate among the images I21 to I25 belonging to the cluster CL20, the image I35 is determined as a representative image candidate among the images I31 to I35 belonging to the cluster CL30, and the image I45 is determined as a representative image candidate among the images I41 to I45 belonging to the cluster CL40. Then, the window 30 shown in FIG. 12 is displayed on the display screen of the display device 2.

In a case where the image I24 is selected as a representative image among the images I24, I35, and I45, distances from the central value S20 of the cluster CL20 to which the image I24 belongs to the impression values S21 to S25, S31 to S35, and S41 to S45 corresponding to the images I21 to I25, I31 to I35, and I41 to I45 included in the first image group (since the first image group and the second image group are the same unlike in the embodiment described above, the first image group is applied) are calculated.

In a case where the image I24 included in the cluster CL20 is selected as a representative image, the distances from the central value S20 of the cluster CL20 to the impression values S21 of I25 of the images I21 to S25 included in the cluster CL20 (differences in impression value) are ΔS21 to ΔS25 similarly to the case calculated with reference to FIG. 11. However, the distances from the central value S20 of the cluster CL20 to the impression values S31 of I35 of the images I31 to S35 included in the cluster CL30 are S51 to ΔS55, and the distances from the central value S20 of the cluster CL20 to the impression values S41 of I45 of the images I41 to S45 included in the cluster CL40 are S61 to ΔS65. The image evaluation values of the images I21 to I25, I31 to I35, and I41 to I45 included in the first image group are calculated by the CPU 7 using the distances obtained as described above.

Table 4 is an example of a table in which image evaluation values and the like are stored.

TABLE 4

| Image | Cluster | Image quality evaluation value | Distance from selected central value | Image evaluation value |
|---|---|---|---|---|
| I21 | CL20 | Q21 | ΔS21 | Q21/ΔS21 |
| I22 | CL20 | Q22 | ΔS22 | Q22/ΔS22 |
| \| | \| | \| | \| | \| |
| I31 | CL30 | Q31 | ΔS51 | Q31/ΔS51 |
| I32 | CL30 | Q32 | ΔS52 | Q32/ΔS52 |
| \| | \| | \| | \| | \| |
| I41 | CL40 | Q41 | ΔS61 | Q41/ΔS61 |
| I42 | CL40 | Q42 | ΔS62 | Q42/ΔS62 |
| \| | \| | \| | \| | \| |

The images I21 to I25 included in the cluster CL20 to which the image I24 selected as a representative image by the user belongs have the same image evaluation values stored in Table 2. However, for the cluster CL30 and the cluster CL40 different from the cluster CL20 to which the image I24 selected as a representative image by the user belongs, the images included in the cluster CL30 and the cluster CL40 have different image evaluation values from those stored in Table 2. For example, in the case of the image I31 included in the cluster CL30, the distance from the central value S20 of the cluster CL20 to the impression value S31 of the image I31 is ΔS51. Therefore, assuming that the image quality evaluation value of the image I31 is Q31, the image evaluation value of the image I31 is Q31/ΔS51. In the case of the image I41 included in the cluster CL40, the distance from the central value S20 of the cluster CL20 to the impression value S41 of the image I41 is ΔS61. Therefore, assuming that the image quality evaluation value of the image I41 is Q41, the image evaluation value of the image I41 is Q41/ΔS61. For the other images I32 to I35 included in the cluster CL30 and the other images I42 to I45 included in the cluster CL40, the image evaluation value is similarly calculated by the CPU 7. In a case where the difference between the central value of the impression values of a plurality of images included in a cluster and the impression value of each image included in the cluster is large, the image evaluation value is calculated to be lower than in a case where the difference is small. In addition, in a case where the image quality of the image included in the cluster is poor, the image evaluation value is calculated to be lower than in a case where the image quality is good.

As described above, the plurality of images included in the first image group and the plurality of images included in the second image group may be the same.

FIGS. 15 and 16 show a modification example, and are flowcharts showing the processing procedure of the image evaluation apparatus 1. FIGS. 15 and 16 correspond to FIGS. 8 and 9.

In the present embodiment, a plurality of images included in the first image group and a plurality of images included in the second image group are input to the image evaluation apparatus 1, but the plurality of images included in the second image group for determining a representative image candidate are classified into a plurality of clusters using images having image qualities equal to or higher than a threshold value.

In the same manner as in the processing procedure shown in FIGS. 8 and 9, a plurality of images included in the first image group and a plurality of images included in the second image group are input to the image evaluation apparatus (steps 91 and 92). The first image group and the second image group may be the same, and the plurality of images included in the first image group may be the same as the images included in the second image group. In a case where the plurality of images included in the first image group and the images included in the second image group are the same, any image of the plurality of images included in the first image group or the plurality of images included in the second image group may be input to the image evaluation apparatus 1, and both of the first image group and the second image group may not be present or either the first image group or the second image group may be present.

The image quality of each of the plurality of images included in the second image group is determined by the CPU 7 (step 93), and images having image qualities equal to or higher than the threshold value among the plurality of images included in the second image group are classified into a plurality of clusters by the CPU 7 (an image classification device) as shown in FIG. 10 (step 94). For example, assuming that the plurality of images included in the second group are I21 to I25, I31 to I35, and I41 to I45 and all of the images I21 to I25, I31 to I35, and I41 to I45 have image qualities equal to or higher than the threshold value, the images I21 to I25, I31 to I35, and I41 to I45 are classified into the clusters CL20, CL30, and CL40 as shown in FIG. 10. The central values S20, S30, and S40 of the impression values of the plurality of images included in the plurality of clusters CL20, CL30, and CL40 are calculated by the CPU 7 (step 95), and the differences ΔS21, ΔS31, ΔS41 between the calculated central values S20, S30, and S40 and the impression value of each image included in each cluster and the like are calculated by the CPU 7 as shown in FIG. 11 (step 76).

The image evaluation values of the plurality of images included in the second image group are calculated from the calculated difference between the impression values and the calculated image quality by the CPU 7 (step 97), and a representative image candidate is determined by the CPU 7 for each cluster in the same manner as described above (step 98). The images I24, I35, and I45 as the determined representative image candidates are displayed on the display screen of the display device 2 by the display control device 3 (a representative image candidate display control device) as shown in FIG. 12 (step 99). Among the displayed representative image candidates, a representative image is selected by the user (step 100). For example, the image I24 is selected as a representative image.

The image quality of the image included in the first image group is determined by the CPU 7 (step 101).

Then, the difference between the central value S20 of the impression values of the plurality of images included in the cluster CL20 to which the representative image belongs and the impression value of an image having an image quality equal to or higher than the threshold value, among the images included in the first image group, is calculated (step 102). For example, assuming that the plurality of images included in the first image group are I51 to I59 and all of the images I51 to I59 have image qualities equal to or higher than the threshold value, differences ΔS51 to ΔS59 between the central value S20 and the impression values S51 to S59 of the images I51 to I59 are calculated by the CPU 7 as shown in FIG. 13. From the differences ΔS51 to ΔS59 in impression value calculated in this manner and the image quality of each of the images I51 to I59 included in the first image group, the image evaluation values of the plurality of images I51 to I59 included in the first image group are calculated by the CPU 7 (step 103).

Thus, among the plurality of images included in the second image group, a plurality of images having image qualities equal to or higher than the threshold value are classified into clusters based on the impression value of each image. Therefore, it is possible to prevent images with poor image qualities from being classified into clusters. In addition, the difference between the central value of the impression values of a plurality of images included in the cluster to which the representative image belongs, among the plurality of images included in the first image group, and the impression value of each image having an image quality equal to or higher than the threshold value, among the plurality of images included in the first image group, is detected. Therefore, it is possible to prevent the difference from being detected for an image with a poor image quality.

In a case where the plurality of images included in the first image group and the plurality of images included in the second image group are recorded on the same recording medium, such as the memory card 14, a possibility that the same user has captured these images is high. In a case where the plurality of images included in the first image group and the plurality of images included in the second image group are captured by the same user, the user's imaging tendencies are often similar. Therefore, since a representative image is selected from the plurality of images included in the second image group, the image evaluation value of an image having an impression close to the impression of the representative image, among the plurality of images included in the first image group, is high. In a case where a photobook or the like is created using images having high image evaluation values, the tendency of the images included in the created photobook matches the user's preference. Compared with a case of simply selecting high-quality images to create a photobook, it is possible to create a photobook or the like close to the user's preference.

For example, assuming that the plurality of images included in the first image group are images captured by the user in a certain year and the plurality of images included in the second image group are images captured by the same user in the previous year of the year, a representative image is selected from the images captured in the previous year. Therefore, the image evaluation value of an image having an impression close to the impression of the representative image, among the plurality of images included in the first image group, is high. Also in this case, in a case where a photobook or the like is created using images having high image evaluation values, it is possible to create the photobook using images having the same tendency as the images captured in the previous year. In a case where a photobook is created from images captured in the previous year, it is possible to create a photobook with the same tendency as a photobook created from images captured in the previous year.

Processing units that execute the processing described above include the CPU 7 that executes software to function as various processing units, a programmable logic device whose circuit configuration can be changed after manufacture, such as a field-programmable gate array (FPGA), a dedicated electric circuit that is a processor having a circuit configuration that is designed for exclusive use in order to execute specific processing, such as an application specific integrated circuit (ASIC), and the like.

One processing unit may be configured by one of various processors, or may be a combination of two or more processors of the same type or different types (for example, a combination of a plurality of FPGAs or a combination of a CPU and an FPGA). As an example of configuring a plurality of processing units using one processor, first, as represented by a computer, such as a client computer or a server, there is a form in which one processor is configured by a combination of one or more CPUs and software and this processor functions as a plurality of processing units. Second, as represented by a system on chip or the like, there is a form of using a processor that realizes the function of the entire system including a plurality of processing units with one integrated circuit (IC) chip. Thus, various processing units are configured by using one or more of various processors as a hardware structure.

In addition, the hardware structure of these various processors is an electrical circuit in the form of a combination of circuit elements, such as semiconductor elements.

In the embodiment described above, the image evaluation apparatus 1 described as a dedicated apparatus. However, the image evaluation apparatus 1 may not be a dedicated apparatus but may be a personal computer, may be a so-called smart device such as a smartphone and a tablet device, or may be a mobile phone such as a feature phone.

What is claimed is:

1. An image evaluation apparatus, comprising:
  a processor configured to:
    receive an input of a plurality of images included in a first image group;
    select a representative image;
    calculate an image evaluation value from a difference between an impression value of the selected representative image and an impression value of each of the plurality of images and an image quality of each of the plurality of images included in the first image group;
    receive an input of a plurality of images included in a second image group;
    classify the plurality of images included in the second image group into a plurality of clusters based on an impression value of each of the plurality of images included in the second image group;
    calculate an image evaluation value of each of the plurality of images included in the clusters based on a difference between a central value of impression values of the plurality of images included in the plurality of clusters and an impression value of each image included in the clusters and an image quality of each image included in the clusters;
    determine representative image candidates for each of the clusters based on the image evaluation value; and
    display the representative image candidates,
  wherein the processor selects at least one representative image candidate, among the representative image candidates, as a representative image, and calculates the image evaluation value based on a difference between a central value of impression values of a plurality of images included in a cluster to which the selected representative image belongs, among the plurality of clusters, and an impression value of each of the plurality of images included in the first image group and an image quality of each of the plurality of images included in the first image group.

2. The image evaluation apparatus according to claim 1, wherein
  the processor is further configured to:
    display images having image qualities equal to or higher than a threshold value, among the plurality of images, as representative image candidates, wherein the processor selects at least one representative image candidate, among the representative image candidates, as a representative image.

3. The image evaluation apparatus according to claim 1, wherein
the processor is further configured to:
display a plurality of images having a variation in impression value equal to or higher than a threshold value or a plurality of images of a predetermined number or a predetermined proportion in descending order of variation in impression value, among the plurality of images, as representative image candidates,
wherein the processor selects at least one representative image candidate, among the representative image candidates, as a representative image.

4. The image evaluation apparatus according to claim 1, wherein
the processor is further configured to:
display a plurality of images having a maximum value or a minimum value of each impression value for impression values of a plurality of impression axes, among the plurality of images, as representative image candidates,
wherein the processor selects at least one representative image candidate, among the representative image candidates, as a representative image.

5. The image evaluation apparatus according to claim 1, wherein the plurality of images included in the first image group and the plurality of images included in the second image group are stored in the same storage device.

6. The image evaluation apparatus according to claim 1, wherein the plurality of images included in the first image group and the plurality of images included in the second image group are the same.

7. The image evaluation apparatus according to claim 1, wherein the processor calculates the image evaluation value, in a case where a difference between a central value of impression values of a plurality of images included in a cluster to which the representative image belongs and an impression value of each of the plurality of images included in the first image group is larger than a threshold value, to be lower than in a case where the difference is small and calculates the image evaluation value, in a case where an image quality of each of the plurality of images included in the first image group is poorer than a threshold value, to be lower than in a case where the image quality is good, and
the processor calculates the image evaluation value, in a case where a difference between a central value of impression values of the plurality of images included in the cluster and an impression value of each image included in the cluster is larger than a threshold value, to be lower than in a case where the difference is small and calculates the image evaluation value, in a case where an image quality of each image included in the cluster is poorer than a threshold value, to be lower than in a case where the image quality is good.

8. The image evaluation apparatus according to claim 1, wherein the processor classifies the plurality of images into a plurality of clusters based on an impression value of each image for a plurality of images having image qualities equal to or higher than a threshold value among the plurality of images included in the second image group, and the processor calculates the image evaluation value based on a difference between a central value of impression values of a plurality of images included in a cluster to which the selected representative image belongs, among the plurality of clusters, and an impression value of an image having an image quality equal to or higher than the threshold value, among the plurality of images included in the second image group, and an image quality of each of the plurality of images included in the second image group.

9. The image evaluation apparatus according to claim 2, wherein
the processor is further configured to:
display a word, which indicates an impression of the representative image candidate, together with the representative image candidate.

10. An image evaluation method, comprising:
causing a plurality of images included in a first image group to be input to a processor;
causing the processor to select a representative image;
causing the processor to calculate an image evaluation value from a difference between an impression value of the selected representative image and an impression value of each of the plurality of images and an image quality of each of the plurality of images included in the first image group;
causing a plurality of images included in a second image group to be input to the processor;
causing the processor to classify the plurality of images included in the second image group into a plurality of clusters based on an impression value of each of the plurality of images included in the second image group;
causing the processor to calculate an image evaluation value of each of the plurality of images included in the clusters based on a difference between a central value of impression values of the plurality of images included in the plurality of clusters and an impression value of each image included in the clusters and an image quality of each image included in the clusters;
causing the processor to determine representative image candidates for each of the clusters based on the image evaluation value; and
causing the processor to display the representative image candidates,
wherein the processor selects at least one representative image candidate, among the representative image candidates, as a representative image, and calculates the image evaluation value based on a difference between a central value of impression values of a plurality of images included in a cluster to which the selected representative image belongs, among the plurality of clusters, and an impression value of each of the plurality of images included in the first image group and an image quality of each of the plurality of images included in the first image group.

11. A non-transitory recording medium that stores a computer readable program for controlling a computer of an image evaluation apparatus, the program causing the computer to execute:
inputting a plurality of images included in a first image group;
selecting a representative image;
calculating an image evaluation value from a difference between an impression value of the selected representative image and an impression value of each of the plurality of input images and an image quality of each of the plurality of images included in the first image group;

inputting a plurality of images included in a second image group;

classifying the plurality of images included in the second image group into a plurality of clusters based on an impression value of each of the plurality of images included in the second image group;

calculating an image evaluation value of each of the plurality of images included in the clusters based on a difference between a central value of impression values of the plurality of images included in the plurality of clusters and an impression value of each image included in the clusters and an image quality of each image included in the clusters;

determining representative image candidates for each of the clusters based on the image evaluation value; and displaying the representative image candidates, wherein at least one representative image candidate, among the representative image candidates, is selected as a representative image, and the image evaluation value is calculated based on a difference between a central value of impression values of a plurality of images included in a cluster to which the selected representative image belongs, among the plurality of clusters, and an impression value of each of the plurality of images included in the first image group and an image quality of each of the plurality of images included in the first image group.

\* \* \* \* \*